Patented Jan. 28, 1941

2,229,999

UNITED STATES PATENT OFFICE 2,229,999

MANUFACTURE OF CONDENSATION PRODUCTS

Gerhardt Haberland, Breslau, Germany, assignor to Winthrop Chemical Company, Inc., New York, N. Y., a corporation of New York No Drawing. Application May 6, 1939, Serial No. 272,149. In Germany May 10, 1938

5 Claims. (Cl. 260—468)

This invention relates to a process of manufacturing condensation products.

Alpha-halogen fatty acid esters may be reacted with carbonyl compounds of the aliphatic, aromatic-aliphatic and hydroaromatic series in the presence of certain metals such as magnesium and zinc with the formation of beta-hydroxy carboxylic acid esters. This reaction is known under the name "Reformatzky's reaction."

In accordance with the present invention it is most surprising that also beta-halogen fatty acid esters may be reacted with carbonyl compounds of the kind above specified. In this case the corresponding gamma-hydroxy carboxylic acid esters, their derivatives respectively are formed; adipinic acid esters are formed only as a by-product by the interaction of 2 molecules of the beta-halogen fatty acid ester with one another. Preferably the chlorine and bromine compounds are used as the beta-halogen fatty acid esters, but in many cases also the iodine compounds may be used. The alcohol radical of the ester group is optional. The new process is particularly suitable for introducing a propionic acid chain into hydrogenated polycyclic systems, containing a carbonyl group. Most surprising is the relatively high reactivity of tricyclic ketones in which the two ortho-positions to the carbonyl group are substituted. The reaction products which are obtainable from the tricyclic ketones may be condensed to tetracyclic ketones.

The invention is illustrated by the following examples without being restricted thereto:

Example 1

5 grams of 6-methoxy-tetralone-1 are heated with 5.5 grams of beta-bromopropionic acid ethylester in benzene in the presence of 0.7 gram of magnesium powder. After the addition of a slight quantity of iodine reaction takes place while the mixture becomes turbid. After 3 hours the mixture is cooled, then decomposed by means of ice-water and dilute sulfuric acid and thereafter extracted with ether. The ether is distilled off from the ethereal solution and the residue saponified by means of a methylalcoholic potassium hydroxide solution with the addition of water. After extracting the neutral components from the reaction mixture by means of ether, the mixture is acidified by means of dilute hydrochloric acid, the 6-methoxy-tetralol-1-propionic acid precipitated is dissolved in ether and after the removal of the ether the residue is distilled in a high vacuum. The product distils while simultaneously splitting off water at 0.3 mm. pressure from 185–190° C. in the form of a colorless oil which soon crystallizes. After recrystallization from methanol and benzine 1.5–2 grams of colorless crystals are obtained which melt at 117.5–118° C. The product is probably the 6-methoxy-dihydronaphthalene-1-propionic acid.

Example 2

20 grams of 6-methoxy-tetralone-1 are reacted with 17 grams of beta-chloro-propionic acid methylester. When working up the reaction mixture in an analogous manner as described in Example 1 the same reaction product as indicated in Example 1 melting at 117° C. is obtained.

Example 3

7.5 grams of 1-keto-2-methyl-7-methoxy-1,2,3,4-tetrahydrophenanthrene are treated with 6 grams of beta-bromo-propionic acid ethyl ester in benzene in the presence of 0.8 gram of magnesium powder. After 10 hours' heating the reaction mixture is decomposed by means of ice and dilute hydrochloric acid and then extracted with ether. The ether is distilled off from the ethereal solution and the residue is boiled with alcoholic potassium hydroxide solution. The unchanged parts of the initial ketone are then extracted from the mixture by means of ether. By acidification of the dilute alkaline solution the lactone of the 1-hydroxy-2-methyl-7-methoxy-1,2,3,4-tetrahydrophenanthrene-1-propionic acid is precipitated; by recrystallization from dilute methanol or acetone colorless crystals melting at 194° C. may be obtained. The reaction product may be subjected to further condensation as described in my copending application for Letters Patent Ser. No. 221,013 filed July 23, 1938, now Patent No. 2,193,674. Also in this case a tetracyclic ketone is obtained which after splitting off of the methyl group from the methoxy group shows a very high oestrus activity in the small dose of a few gamma.

I claim:

1. The process of manufacturing condensation products which comprises reacting upon a carbonyl compound selected from carbonyl compounds of the aromatic-aliphatic and hydroaromatic series with a beta-halogen propionic acid ester in the presence of a metal of the group consisting of magnesium and zinc.

2. The process of manufacturing condensation products which comprises reacting upon a carbonyl compound selected from carbonyl compounds of the aromatic-aliphatic and hydroaromatic series with a beta-halogen propionic acid ester in the presence of a metal of the group consisting of magnesium and zinc and in the presence of a solvent which is inert to the reacting components.

3. Process as claimed in claim 2 in which a polyhydronaphthalene-ketone is used as the carbonyl compound.

4. Process as claimed in claim 2 in which a polyhydrophenanthrene-ketone is used as the carbonyl compound.

5. The process of manufacturing condensation products which comprises reacting upon 1-keto-2-methyl-7-methoxy-1,2,3,4-tetrahydrophenanthrene with a beta-bromopropionic acid ester in benzene in the presence of magnesium.

GERHARDT HABERLAND.